United States Patent [19]

Akiyama

[11] 4,199,877
[45] Apr. 29, 1980

[54] COLOR HARMONY SCALE

[75] Inventor: Tatehito Akiyama, Nishinomiya, Japan

[73] Assignee: C. Itoh Fashion System Co., Ltd., Osaka, Japan

[21] Appl. No.: 889,425

[22] Filed: Mar. 23, 1978

[30] Foreign Application Priority Data

Apr. 8, 1977 [JP] Japan .............................. 52-44207[U]

[51] Int. Cl.² .............................................. B44D 2/00
[52] U.S. Cl. ......................................... 35/28.3; 35/75
[58] Field of Search ................. 35/28.3, 28.5, 2, 31 A, 35/35 F, 74; 40/115

[56] References Cited

U.S. PATENT DOCUMENTS

| | | | |
|---|---|---|---|
| 2,201,888 | 5/1940 | Deutsch | 35/28.3 |
| 2,229,025 | 1/1941 | Keyes | 35/28.3 |
| 2,238,316 | 4/1941 | Gaugler | 35/28.3 |
| 2,916,833 | 12/1959 | Di Salvo | 35/28.3 |
| 3,419,973 | 1/1969 | Manotas | 35/31 A |

Primary Examiner—Harland S. Skogquist
Attorney, Agent, or Firm—Kenyon & Kenyon

[57] ABSTRACT

A color harmony scale used for color planning in any field comprises a color plate, a middle plate and a top plate, which are rotatably placed on top of each other. The middle plate and the top plate are provided with windows in accordance with the known color harmony principle. During rotation of the color harmony scale, colors which harmonize with each other can be seen through windows on the middle and the top plates.

7 Claims, 4 Drawing Figures

COLOR HARMONY SCALE

BRIEF DESCRIPTION OF THE INVENTION

The present invention relates to an improved color harmony scale which is used for obtaining a desired color harmony to be applied to designing of ladies' wear, interior decorating or other type of decorating and for obtaining a color scheme from a range of different colors.

BRIEF DESCRIPTION OF THE PRIOR ART

Heretofore, several designs have already been proposed for constructing a color harmony scale. Such known color harmony scale can comprise, for example, a color plate with a plurality of color chips disposed thereupon in a circular arrangement and a revolving plate placed on top of the color plate, the revolving plate is provided with a plurality of windows spaced equiangularly around the center thereof. Both plates are rotatably pivoted with each other or their centers.

However, when a base window, which can be any one of the equiangularly-spaced windows, is proved to correspond to a suitable color chip on the color plate, such as that of a base color, other color chips on the color plate, which are undesired to be seen as the harmonized colors, can be seen through the remaining windows. In order to obtain a standard three-color harmony of the color chips, for example, it is necessary to search for the windows which are angularly spaced at 120° from the base window, and to confirm the correctness of the angle by means of a graduator. For such reaons, the conventional color harmony scale is disadvantageous due to its difficult handling which may cause confusion and errors during attempts to obtain the desired color harmony.

OBJECTS OF THE INVENTION

Accordingly, it is a primary object of the present invention to obviate the aforementioned disadvantage by providing an improved color harmony scale.

Another object of the present invention is to provide an improved color harmony scale comprising a color plate having a pluraity of colored members disposed in the circumferential direction thereof in accordance with the color order system, a middle plate which is placed on top of the color plate, and which has a plurality of windows, through which a plurality of harmonized colors on the color plate can be seen, and a top plate which is placed on top of the middle plate and which has a plurality of windows including a base window and windows angularly spaced with respect to the base window, through which windows a plurality of harmonized colors can also be seen. Accordingly, when the middle plate and the top plane are rotatably moved about their centers, the desired set of harmonized colors can be seen only through the windows of the top plate and the middle plate.

Other objects of the present invention will become obvious from the embodiment described hereinafter and from the embodiments indicated in the appended claims. Furthermore, various advantages not referred to herein will certainly become apparent when the present invention is carried out by one skilled in the art.

BRIEF DESCRIPTION OF THE DRAWINGS

A preferred embodiment of the invention will now be described in detail with reference to the accompanying drawings, wherein the same reference numerals are used to designate similar parts through the different views, in which.

DETAILED DESCRIPTION OF THE INVENTION

Figure 1:
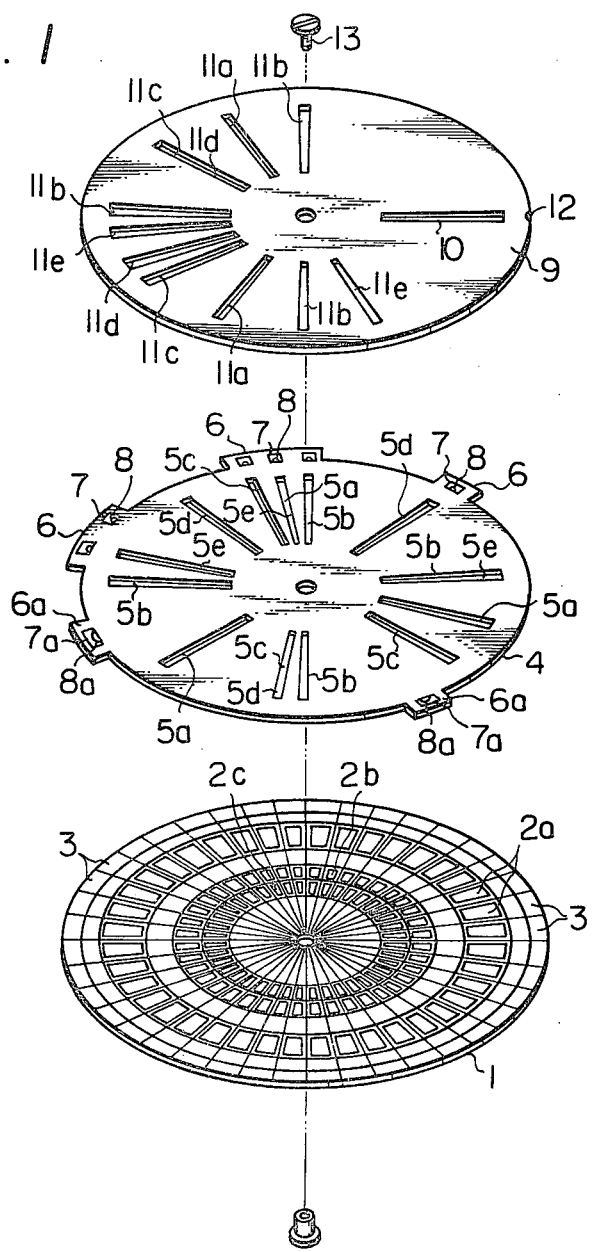
FIG. 1 is an exploded perspective view showing an embodiment of a color harmony scale according to the present invention.
Figure 2:
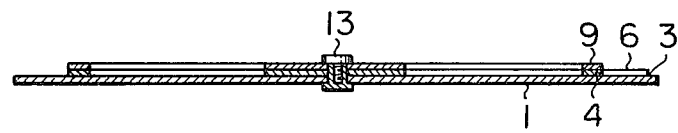
FIG. 2 is a cross-sectional view of FIG. 1.

Referring to the drawings and more particularly to FIGS. 1 and 2, a circular-shaped color plate 1 made of a thick paper material, a plastic plate or the like is divided on the surface thereof, for example, by means of forty lines originating from the center of the color plate along the radial direction into forty narrow sectors. Such narrow sectors are also divided by means of concentric lines having different diameters into shorter sectors. Upon these divided outer sectors, color chips ($2a,2a$ ... ) in different shades of yellow, green, blue and red, etc., in accordance with the Munsell color order system, are fixed onto the color plate 1 in a circular arrangement. Color chips ($2b,2b$ ... ) having the same hues and higher values than those of the color chips ($2a,2a$ ... ), and color chips ($2c,2c$ ... ) having the same hues and lower color values than those of the color chips ($2a,2a$ ... ) are positioned along the radial directions of the color plate 1. All of the chroma of these color chips ($2b,2b$ ... ; $2c,2c$ ... ) are arranged in about the same chroma order. Name labels 3 are marked on the outermost peripheral portion of the color plate 1 to indicate the different hues of the color chips.

A circular-shaped middle plate 4 having a diameter which is smaller than that of the color plate 1 by a radius corresponding to the area occupied by the name labels 3 is rotatably placed on the upper surface of the color plate 1. It is known that, according to the color harmony principle, colors which harmonize with each other have a geometrical relationship among the colors arranged in a circular order following the Munsell color order system. For example, the positions of the harmonized colors of a standard multicolor harmony scheme can form a standard polygon on the color plate 1. Harmonized colors of an isosceles type multicolor harmony scheme can form an isosceles triangle or a square having four equal sides. Harmonized colors of a geometrical-progression type multicolor harmony scheme can form a polygon having sides with dimensions in accordance with the geometrical-progression ratio. Also, harmonized colors of the Golden-section type color harmony scheme can form a polygon having sides with dimensions in accordance with the Golden-section ratio. Thus, the middle plate 4 is provided with a plurality of windows (or through-holes) through which harmonized colors of a standard multicolor harmony, an isosceles type multicolor harmony, a geometrical-progression type multicolor harmony, the Golden-section type multicolor harmony and the like can be seen on the color plate 1. Each window substantially has the same shape as that of each of the forty sectors on the color plate 1. For example, three windows ($5a,5a,5a$) are provided on the middle plate 4 at every 120° for determining a standard three-color harmony. Four windows ($5b,5b,5b,5b$) are provided at every 90° on the middle plate 4 for determining a standard four-color harmony. In the same manner as mentioned above, three windows (5c,5c,5c) for determining an isosceles type three-color harmony, three windows (5d,5d,5d) for determining a geometrical-progression type three-color harmony and three windows (5e,5e,5e) for determining the Golden-section type three-color harmony are respectively provided on the middle plate 4. It should be noted that spaces should be left between adjacent windows (5a . . . 5e) to prevent the windows from interfering with each other.

A projected portion or handle 6 is provided on the plate 4 at the outermost periphery for indentifying each particular set of windows (5a . . . 5e). Indicator labels (7,7 . . . ) showing the different kinds of color harmony which can be obtained, e.g., the standard three-color harmony, the standard four-color harmony or the like, as well as outwardly oriented half-circle symbols 8 ($\triangle$ marks) positioned on the peripheral region of the middle plate 4, are marked on the surface of the handles (6,6 . . . ). Also, other handles 6a with indicator labels 7a and half-circle symbols 8a are disposed at the outer periphery of the plate 4. The purpose of these lables 7a and symbols 8a is to provide guides for determining a particular color harmony, e.g., a geometrical-progression type four-color harmony, another isosceles type three-color harmony, another Golden-section three-color harmony or the like, which can all be obtained by selectively combining several of the windows (5a . . . 5e).

A circular-shaped top plate 9, which has substantially the same diameter as that of the middle plate 4 and has a base window 10 at an optical location thereon is placed on the upper surface of the middle plate 4. The top plate 9 also has a plurality of windows (11a . . . 11e) which are angularly spaced with respect to the base window 10 in a circumferential direction. Through the window 10 and windows (11a . . . 11e) a particular multicolor harmony, e.g., the standard three-color harmony or the standard four-color harmony, etc., can be seen on the color plate 1. These windows (10,11a . . . 11e) are designed to have the exact same shapes as those of the windows (5a . . . 5e) and are also positioned so as not to interfere with each other.

For obtaining a standard three-color harmony, two windows (11a,11a) in addition to the base window 10 are provided on the top plate 9 at every 120°. For obtaining a standard four-color harmony, three windows (11b,11b,11b) in addition to the base window 10 are provided at every 90°. Furthermore two windows (11c,11c) for determining an isosceles type three-color harmony, two windows (11d, 11d) for determining a geometrical-progression type three-color harmony and two windows (11e, 11e) for determining a Golden section type three-color harmony in addition to the base window 10 are provided on the top plate 9.

It should be noted that the windows (5a . . . 5e) are provided on the middle plate 4 according to the following predetermined relationship. That is to say, when the base window of the top plate 9 is aligned with any one of the windows of each particular windows (5a . . . 5e) on the middle plate 4 for indicating a desired color harmony scheme, only the set of obtained harmonized colors can be seen through the base window 10 and the corresponding windows (11a . . . 11e), which are angularly spaced with respect to the base window 10, while the remaining undesired windows on the middle plate 4 and colors on the color plate 1 are covered by the plate 9. An inwardly oriented matching half-circle symbol 12 ($\smile$ mark) is marked adjacent to the side of the base window 10 closest to the circumferential edge of the top plate 9.

The aforementioned color plate 1, middle plate 4 and top plate 9 are placed on top of each other in that exact order, and are rotatably pivoted by means of a rivet 13 or the like to form the resultant color hamony scale according to the present invention.

The use of a color harmony scale constructed according to the above description will be presented hereinafter with particular reference to FIGS. 3 and 4.

Figure 3:
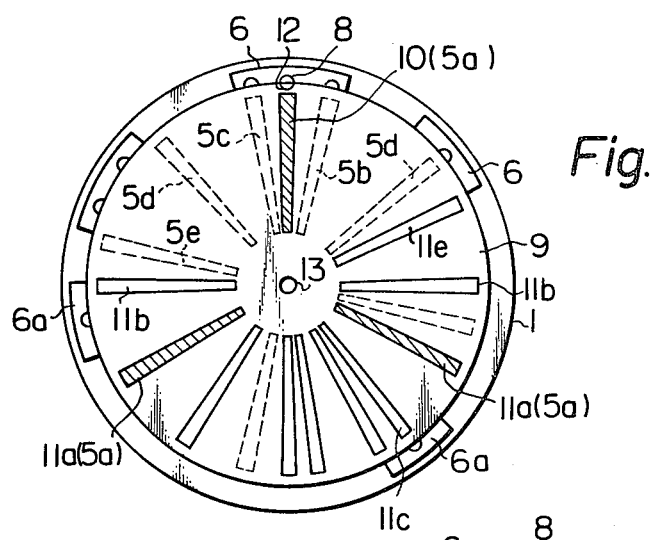
FIGS. 3 and 4 are respective plan views showing the operating positions of the color harmony scale according to the present invention.
Figure 4:
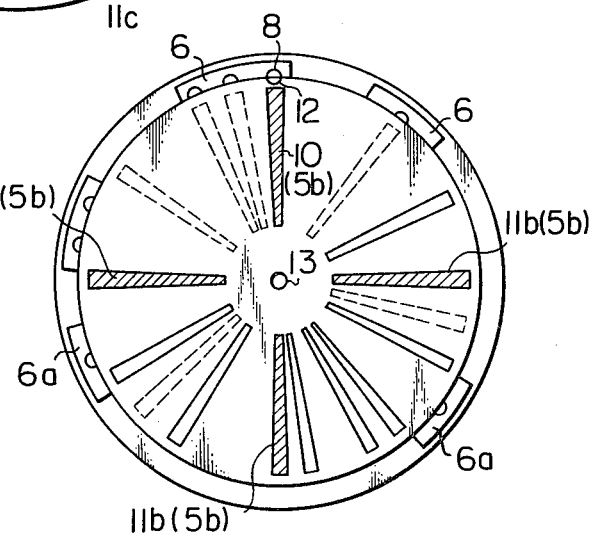

In order to obtain colors which harmonize with a particular coor chip 2a on the color plate 1 in accordance with the standard three-color harmony scheme, the handle 6 of the middle plate 4 with the standard three-color harmony label marked thereon is first moved to be aligned with the color chip 2a, then the top plate 9 is rotated so that the half-circle symbol 12 located at the outer periphery of the base window 10 on the plate 9 is aligned with the half-circle symbol 8 on the handle 6, as shown in FIG. 3. When the matching half-circle symbols 8 and 12 form a complete circle symbol, the base window 10 and the windows (11a,11a) are aligned with the windows (5a,5a,5a) of the middle plate 4, respectively. Consequently, harmonized colors on the color plate 1 corresponding to the standard three-color harmony scheme can be seen only through the base window 10 and windows (11a,11a) of the top plate 9, and the other remaining undesired colors cannot be seen through the top plate 9. Also, in order to obtain harmonized colors of the standard four-color harmony scheme or of other multicolor schemes, the half-circle symbol corresponding to the base window 10 on the top plate 9 is moved to be aligned with the half-circle symbol 8 of the appropriate handle 6 of the middle plate 4. As a result, the desired color harmony can be seen through the base window 10 and windows (11b,11c,11d or 11e) as shown in FIG. 4. As described above, the windows (11a . . . 11e) are positioned according to a predetermined angular relationship with respect to the base window 10.

Although color chips 2a are fixed onto the color plate 1 of the embodiment described above, such color chips may also be formed by means of directly printing colors onto the color plate 1 or by other similar means. An arrangement of color chips similar to that on the surface of the color plate 1 can be provided on the reverse side thereof. In such a case, a circular plate may be rotatably pivoted on the reverse side of the color plate 1, which has a base window identified by a symbol and other windows disposed in a predetermined angular relationship with respect to the base window. Through the base window and the other angularly related windows, similar colors, contrasting colors or the like can be seen on this modified embodiment of the color plate according to the present invention.

As stated above, according to the present invention, a color harmony scale comprises a color plate 1 having a plurality of colored members 2a disposed in the circumferential direction thereof in accordance with the known color harmony principle, a middle plate 4 placed on top of the color plate 1 and provided with windows (5a,5b . . . ) through which harmonized colors of the standard three-color harmony scheme the standard four-color harmony scheme or the like can be seen on the color plate 1, and a top plate 9 placed on top of the middle plate 4 and provided wth a single base window 10 and windows (11a, 11b . . . ), through which harmonized colors of the standard three-color harmony scheme, the standard four-color harmony scheme or the like can be seen, such windows (11a,11b . . . ) being provided in a predetermined angular relationship with respect to the single base window 10. The centers of the color plate 1, the middle plate 4 and the top plate 9 are rotated together by means of a pivoting means 13.

Accordingly, when a certain color is selected as a base color, other colors which can harmonize with the base color can be obtained by a simple rotation of the top plate 9 and the middle plate 4.

Furthermore, according to the present invention, the middle plate 4 is provided with windows (5a, . . . 5e) through which harmonized colors of the standard three-color harmony scheme on the standard four-color harmony scheme can be seen by rotating the middle plate 4. Furthermore, the top plate 9 is provided with a base window 10 and windows (11a, . . . 11e) angularly spaced with respect to the base window 10, through which windows (10,11a . . . ; or 10,11b . . . ; or 10,11c . . . ; or 10,11d . . . ; or 10,11e . . . ) different schemes of harmonized colors can be seen. Thus, since only the desired harmonized colors can be seen through aligned windows of the top and bottom plates, while the other undesired colors on the color plate cannot be seen through those plates, thereby inaccurate selection of color harmony can be prevented from occurring.

In addition to the above-described embodiment of the color harmony scale, modifications of the present invention are possible in the light of the above teaching.

What is claimed is:

1. A color harmony scale comprising:
    a color plate (1) having a plurality of colored members (2a, 2b . . . ) disposed circularly thereon in sequence along the circumferential direction thereof in accordance with the color harmony principle;
    a middle plate (4) placed on top of said color plate (1) and provided with at least two separate sets of angularly spaced windows (5a, 5b . . . ) through each set of which harmonized colors of a different standard color harmony scheme can be seen on said color plate (1), each set of windows being disposed so as not to interfere with the windows of the other set;
    a top plate (9) placed on top of said middle plate (4) and provided with a single base window (10) and a plurality of additional windows (11a, 11b . . . ), said additional windows (11a, 11b . . . ) being provided in a predetermined angular relationship with respect to said single base window (10) to form a plurality of sets of windows corresponding to the sets on said middle plate (4), each set of windows in said top plate (9) including said base window so that only the harmonized colors of one of said standard color harmony schemes can be seen on the color plate (1) when the base window on the top plate (9) is angularly aligned with a selected one of the windows of the set on the middle plate (4) corresponding to said color harmony scheme; and
    pivoting means (13) for rotatably securing together said color plate (1), said middle plate (4) and said top plate (9) at the centers thereof.

2. A color harmony scale according to claim 3, wherein said indicia comprise:
    projecting portions (6,6 . . . ) provided on the outer periphery of said middle plate (4) in angular relation corresponding with the angular spacing of the selected ones of said sets of windows (5a, 5b . . . );
    indicator means (7) for indicating each different standard color harmony scheme together with symbol means (8, 8a) being disposed on the surface of said projecting portions (6,6 . . . ); and
    an additional symbol means (12) being disposed on the outer periphery of said top plate (9) in angular relation to said base window such that said base window is angularly aligned with the selected one of the windows of a set on the middle plate when said additional symbol means (12) is matched with the corresponding symbol means (8, 8a) on the middle plate.

3. A color harmony scale according to claim 1 further comprising indicia disposed on said middle plate and on said top plate to align the base window with each selected one of the windows on the middle plate when the corresponding indicia on said plates are matched.

4. A color harmony scale according to claim 1 wherein
    each of said plurality of color members of a given hue occupies a predetermined angular sector of said color plate, and said plurality of color members includes at least two members of the same hue but of different color values disposed along the radial direction in each of said predetermined angular sectors and
    said windows in the middle and top plates each has an angular width corresponding to said predetermined angular sector and a radial length sufficient to reveal all color members of the same hue.

5. A color harmony scale according to claim 4 wherein said plurality of color members comprises three radially disposed color members for each hue.

6. A color harmony scale according to claim 4 wherein color members of different hues and approximately the same chroma are disposed in a predetermined annular band.

7. A color harmony scale according to claim 1 wherein said different standard color harmony schemes comprise at least a standard three-color harmony scheme and a standard four-color harmony scheme.

* * * * *